(12) United States Patent
Park et al.

(10) Patent No.: US 8,373,813 B2
(45) Date of Patent: Feb. 12, 2013

(54) ARRAY SUBSTRATE, METHOD OF MANUFACTURING THE SAME AND METHOD OF REPAIRING THE SAME

(75) Inventors: Jae-Hyun Park, Yongin-si (KR); Jong-Hwan Lee, Anyang-si (KR); Kyung-Wook Kim, Seoul (KR)

(73) Assignee: Samsung Display Co., Ltd. (KR)

( * ) Notice: Subject to any disclaimer, the term of this patent is extended or adjusted under 35 U.S.C. 154(b) by 715 days.

(21) Appl. No.: 12/537,348

(22) Filed: Aug. 7, 2009

(65) Prior Publication Data

US 2010/0225870 A1    Sep. 9, 2010

(30) Foreign Application Priority Data

Mar. 9, 2009  (KR) .......................... 10-2009-0019691

(51) Int. Cl.
*G02F 1/1333*  (2006.01)
(52) U.S. Cl. .......... 349/40; 349/149; 349/151; 349/152; 349/187; 257/72
(58) Field of Classification Search .............. 349/40, 349/149, 151, 152, 187
See application file for complete search history.

(56) References Cited

U.S. PATENT DOCUMENTS

| | | | | |
|---|---|---|---|---|
| 6,333,769 | B1* | 12/2001 | Suzuki et al. ................... | 349/40 |
| 7,142,263 | B2* | 11/2006 | Nagata ............................ | 349/54 |
| 7,148,509 | B2* | 12/2006 | Kim et al. ....................... | 257/72 |
| 7,158,195 | B2* | 1/2007 | Chang ............................. | 349/40 |
| 7,297,979 | B2 | 11/2007 | Lim et al. | |
| 7,619,436 | B2* | 11/2009 | Kwak ....................... | 324/760.02 |
| 2004/0119925 | A1* | 6/2004 | Moon ........................... | 349/139 |
| 2005/0162581 | A1* | 7/2005 | Lim et al. ....................... | 349/54 |

FOREIGN PATENT DOCUMENTS

KR    1020060094198 A    8/2006

\* cited by examiner

*Primary Examiner* — Edward Glick
*Assistant Examiner* — Sang Nguyen
(74) *Attorney, Agent, or Firm* — Cantor Colburn LLP

(57) ABSTRACT

An array substrate includes a substrate including a display area and a peripheral area surrounding the display area, data lines disposed in the display area and including a portion thereof extending from the display area into the peripheral area at a first side of a periphery of the display area, and a repair line disposed in the peripheral area and crossing the portion of the data lines extending into the peripheral area. The array substrate also includes a static electricity diode part electrically connected to the repair line and a first data line of the data lines.

9 Claims, 7 Drawing Sheets

ARRAY SUBSTRATE, METHOD OF MANUFACTURING THE SAME AND METHOD OF REPAIRING THE SAME

This application claims priority to Korean Patent Application No. 2009-19691, filed on Mar. 9, 2009, and all the benefits accruing therefrom under 35 U.S.C. §119, the content of which in its entirety is herein incorporated by reference.

BACKGROUND OF THE INVENTION

1. Field of the Invention

The present invention relates to an array substrate, a method of manufacturing the array substrate and a method of repairing the array substrate. More particularly, the present invention relates to an array substrate for a liquid crystal display ("LCD") panel, a method of manufacturing the array substrate and a method of repairing the array substrate, wherein adverse effects due to static electricity are substantially reduced and/or effectively prevented.

2. Description of the Related Art

Generally, a liquid crystal display ("LCD") panel includes an array substrate including a thin-film transistor ("TFT") as a switching element to drive a pixel, an opposing substrate facing the array substrate, and a liquid crystal layer disposed between the array substrate and the opposing substrate. An image is displayed on the LCD panel by controlling a light transmittance of the liquid crystal layer, which changes according to a voltage applied thereto. The array substrate is typically divided into a display area for displaying the image and a signal providing area, e.g., a peripheral area, surrounding the display area. Unit pixels including the TFT and a pixel electrode formed in a pixel region are disposed in the display area.

The array substrate is typically manufactured by forming the TFTs and the pixel electrodes on a mother substrate for the array substrate, and then cutting the mother substrate into cell units. The mother substrate for the array substrate usually includes a guard ring used as static electricity dispersion wiring in attempts to minimize damage due to static electricity generated during manufacturing of the array substrate. The guard ring is disposed adjacent to an outside of a cutting line of the unit cell on the mother substrate. The guard ring is meant to disperse the static electricity generated at the mother substrate to the entire mother substrate to prevent a defect such as a short circuit or an open circuit in regions of the mother substrate. However, the ability of the guard ring to disperse the static electricity is limited.

In the LCD, signal lines in the display area include gate lines which transmit gate signals and data lines which transmit data signals. The gate lines and the data lines are extremely delicate. Therefore, the data line, for example, often becomes disconnected during manufacturing of the array substrate. As a result, the data signal will not be transmitted to the data line in the LCD and thus the array substrate must be discarded. When the array substrate is discarded because of the disconnection of the data line, a productivity of manufacturing the array substrate is significantly decreased.

In attempts to solve the above-described problem, a method using redundancy, e.g., an additional line such as a repair line, is generally used. Normally, the repair line is electrically separated from the signal line by an insulation layer between the repair line and the signal line. However, when the data line is disconnected, a crossing section of the repair line and the disconnected data line is connected using a laser. Therefore, even though a portion of the data line is disconnected, the unit pixels connected to the disconnected data line may be normally operated through the repair line.

However, the repair line acts as a stepping stone for introducing static electricity generated at the guard ring into the display area. Moreover, the static electricity introduced into the display area through the repair line damages the signal wiring and the pixel electrode, and the productivity of the array substrate is further decreased.

BRIEF SUMMARY OF THE INVENTION

Exemplary embodiments of the present invention provide an array substrate that effectively prevents defects due to static electricity generated during manufacturing of the array substrate.

Exemplary embodiments of the present invention also provide a method of manufacturing the array substrate.

Exemplary embodiments of the present invention further provide a method of repairing the array substrate.

According to an exemplary embodiment of the present invention, an array substrate includes a substrate, data lines, a repair line and a static electricity diode part. The substrate includes a display area and a peripheral area surrounding the display area. The data lines are disposed in the display area and a portion thereof extends into the peripheral area from the display area at a first side of a periphery of the display area. The repair line is disposed in the peripheral area and crosses the portion of data lines extending into the peripheral area. The static electricity diode part is electrically connected to the repair line and a first data line of the data lines.

In an exemplary embodiment, the static electricity diode part may include a first static electricity diode. The first static electricity diode may be electrically connected to the repair line and the first data line. In addition the first data line may be adjacent to a second side of the periphery of the display area, and the data lines do not extend into the peripheral area at the second side of the periphery of the display area. The static electricity diode part may further include a second static electricity diode. The second electricity diode may be electrically connected to the repair line and a last data line of the data lines. The last data line may be adjacent to a third side of the periphery of the display area, and the third side of the periphery may face the second side of the periphery.

In an alternative exemplary embodiment, an array a substrate includes: a display area and a peripheral area surrounding the display area; data lines disposed in the display area, a portion of the data lines extending from the display area into the peripheral area at a first side of a periphery of the display area; a repair line disposed in the peripheral area and crossing the portion of the data lines extending to the peripheral area; and a static electricity diode part. The static electricity diode part includes: an input electrode spaced apart from a first data line; an output electrode electrically connected to the repair line; and an active pattern disposed between the input electrode and the output electrode. The first data line is adjacent to a second side of the periphery, and the data lines do not extend into the peripheral area at the second side of the periphery of the display area.

According to another alternative exemplary embodiment of the present invention, a method of manufacturing an array substrate includes: forming data lines in a display area of a substrate; extending a portion of the data lines from the display area into a peripheral area of the substrate at a first side of a periphery of the display area, the peripheral area surrounding the display area; forming a repair line crossing the portion of data lines extended into the peripheral area; and forming a static electricity diode part electrically connected to the repair line and a first data line of the data lines.

The forming the static electricity diode part may include forming a first static electricity diode electrically connected to the first data line, the first data line is disposed adjacent to a second side of the periphery, and the data lines do not extend into the peripheral area at the second side of the periphery of the display area.

According to yet another exemplary embodiment of the present invention, a method of repairing an array substrate includes: forming a substrate including data lines, a repair line and a static electricity diode part, the data lines being disposed in a display area of the substrate and portions thereof extending into a peripheral area at a first side of a periphery of the display area, the peripheral area surrounding the display area, the repair line being disposed in the peripheral area and crossing the portion of the data lines extending into the peripheral area, the static electricity diode part being electrically connected to the repair line and a first data line of the data lines adjacent to a second side of the periphery, and the data lines not extending into the peripheral area at the second side of the periphery of the display area; inspecting the data lines to identify an opened data line; and repairing the opened data line by electrically connecting the opened data line to the repair line.

In an exemplary embodiment, the repairing the opened data line comprises cutting a connecting portion between the static electricity diode part and the first data line.

Thus according to exemplary embodiments described herein, in an array substrate, a method of manufacturing the array substrate and a method of repairing the array substrate, static electricity generated at a repair line during manufacturing of the array substrate and/or static electricity introduced by the repair line from an external source is effectively dispersed to a static electricity dispersion wiring via a static electricity diode. Therefore, damage to a pixel due to the static electricity is effectively prevented.

BRIEF DESCRIPTION OF THE DRAWINGS

The above and other aspects, advantages and features of the present invention will become more apparent by describing in further detail exemplary embodiments thereof with reference to the accompanying drawings, in which.

DETAILED DESCRIPTION OF THE INVENTION

Figure 1:
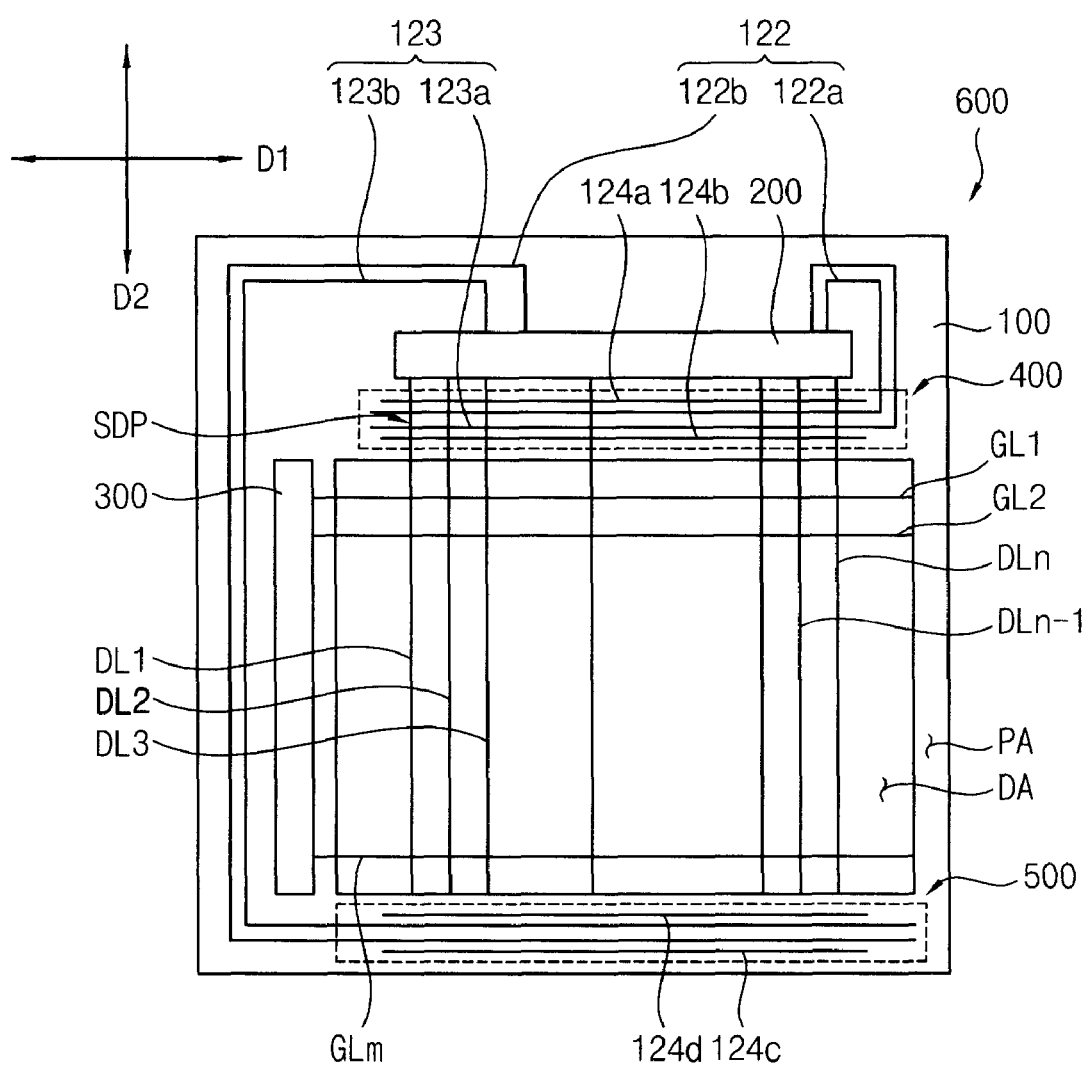
FIG. 1 is a plan view of an exemplary embodiment of a display apparatus according to the present invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of the present invention will be described in further detail with reference to the accompanying drawings.

FIG. 1 is a plan view of an exemplary embodiment of a display apparatus according to the present invention.

Referring to FIG. 1, a display apparatus 600 according to an exemplary embodiment includes an array substrate 100, a data driving chip 200 and a gate driving part 300.

The array substrate 100 includes signal wirings, a static electricity diode part SDP and a first static electricity prevention part 400. The array substrate 100 may further include a second static electricity prevention part 500.

The array substrate 100 is divided into a display area DA which displays an image and a peripheral area PA surrounding the display area DA. The signal wirings are generally disposed in the display area DA. However, portions of the signal wirings extend from the display area DA into the peripheral area PA, as will be described in further detail later. The data driving chip 200, the gate driving part 300, the static electricity diode part SDP, the first static electricity prevention part 400 and the second static electricity prevention part 500 are disposed in the peripheral area PA. In an exemplary embodiment, the data driving chip 200 is disposed in the peripheral area PA adjacent to an upper portion of the display area DA, e.g., a first side thereof, and the gate driving part 200 may be disposed in the peripheral area PA adjacent to a left portion of the display area DA, e.g., a second side of the display area.

The signal wirings include a first signal wiring extending along a first direction D1 of the array substrate 100 and a second wiring extended along a second direction D2 different from the first direction D1. In an exemplary embodiment, the first direction D1 is substantially perpendicular to the second direction D2. The first signal wiring includes first, second, . . . , and m-th gate lines GL1, GL2, . . . , and GLm. The first gate line GL1 and the second gate line GL2 extended into the peripheral area PA and are electrically connected to the gate driving part 300. The second signal wiring includes first, second, third, . . . , (n−1)-th and n-th data lines DL1, DL2, DL3, . . . , DLn−1 and DLn. The first, second, third, . . . , (n−1)-th and n-th data lines DL1, DL2, DL3, . . . , DLn−1 and DLn extend into the peripheral area PA and are electrically connected to the data driving chip 200, as shown in FIG. 1.

When a shape of the display area DA is substantially rectangular shape, a boundary between the peripheral area PA and the display area DA is defined by a surrounding portion, e.g., a periphery, including first (e.g., an upper), second (e.g., a left), third, (e.g., a right) and fourth (e.g., a lower) sides of the display area DA. In an exemplary embodiment, since the first, second, third, . . . , (n−1)-th and n-th data lines DL1, DL2, DL3, . . . , DLn−1 and DLn extend into the peripheral area PA at the first side, e.g., the upper side, of the display area DA, upper and lower boundaries respectively surrounding the upper and lower sides of the display area DA may be defined as a crossing area crossing the first, second, third, . . . , (n−1)-th and n-th data lines DL1, DL2, DL3, . . . , DLn−1 and DLn. However, since left and right boundaries respectively surrounding the left and right sides of the display area DA are substantially parallel to the first, second, third, . . . , (n−1)-th and n-th data lines DL1, DL2, DL3, . . . , DLn−1 and DLn, the left and right boundaries may be defined as a boundary area not crossing the first, second, third, . . . , (n−1)-th and n-th data lines DL1, DL2, DL3, . . . , DLn−1 and DLn. In this case, the first data line DL1 is a data line adjacent to the first side, which is one of the left and right boundaries, for example. For purposes of description, the first data line DL1 will be defined as the data line adjacent to the left boundary, but alternative exemplary embodiments are not limited thereto. More specifically, for example, the first data line DL1 according to an exemplary embodiment is the second signal wiring disposed immediately adjacent to the peripheral area PA at the first side of the display area DA. Put another way, the first data line DL1 is the data line firstly disposed directly adjacent to the left boundary, e.g., the left side, of the display area DA. Accordingly, in an exemplary embodiment, the n-th data line DLn is defined as the data line adjacent to the right boundary opposite to the left boundary. More specifically, the n-th data line DLn is the second signal wiring positioned directly adjacent to the peripheral area PA at the second side of the display area DA, e.g., is a last data line DL. Thus, n-th data line DLn in an exemplary embodiment is the last data line adjacent to the right boundary. In an alternative exemplary embodiment, however, the data line adjacent to the right boundary may be defined as the first data line DL1 and the data line adjacent to the left boundary may be defined as the n-th data line DLn.

The data driving chip 200 provides the first, second, third, . . . , (n−1)-th and n-th data lines DL1, DL2, DL3, . . . , DLn−1 and DLn with a data driving signal. The data driving chip 200 may be mounted on the array substrate 100. The data driving chip 200 may be electrically connected to the static electricity diode part SDP.

The gate driving part 300 provides the first gate line GL1 and the second gate line GL2 with the gate driving signal. The gate driving part 300 may be a chip mounted on the array substrate 100. Alternatively, the gate driving part 300 may be disposed directly on the array substrate 100 during manufacturing of the first gate line GL1 and the second gate line GL2 and the first, second, third, . . . , (n−1)-th and n-th data lines DL1, DL2, DL3, . . . , DLn−1 and DLn.

The static electricity diode part SDP includes at least one repair line. According to an exemplary embodiment, the static electricity diode part SDP includes a first repair line 122 and a second repair line 123.

As shown in FIG. 1, the first repair line 122 begins in a region between the data driving chip 200 and the display area DA, passes through the data driving chip 200 (first sub-line 122a) and then extends to the lower side of the display area DA so as to surround the display area DA (second sub-line 122b).

The second repair line 123 is disposed substantially parallel to the first repair line 122. The second repair line 123 begins in the region between the data driving chip 200 and the display area DA, passes through the data driving chip 200 (third sub-line 123a) and then extends to the lower side of the display area DA so as to surround the display area (fourth sub-line 123b).

More particularly, for purposes of explanation, a portion of the first repair line 122 disposed in the region between the data driving chip 200 and the display area DA is referred to as the first sub-line 122a, and a portion of the first repair line 122 connected to the first sub-line 122a and extended to the lower side of the display area DA is referred to as the second sub-line 122b. In addition, a portion of the second repair line 123 disposed in the region between the data driving chip 200 and the display area DA is referred to as the third sub-line 123a, and a portion of the second repair line 123 connected to the third sub-line 123a and extended to the lower side of the display area DA is referred to as the fourth sub-line 123b.

In the exemplary embodiment shown in FIG. 1, an array substrate including only two repair lines, e.g., the first repair line 122 and the second repair line 123, is illustrated. However, alternative exemplary embodiments are not limited thereto; the array substrate may include only one repair line or three or more repair lines.

Figure 2:
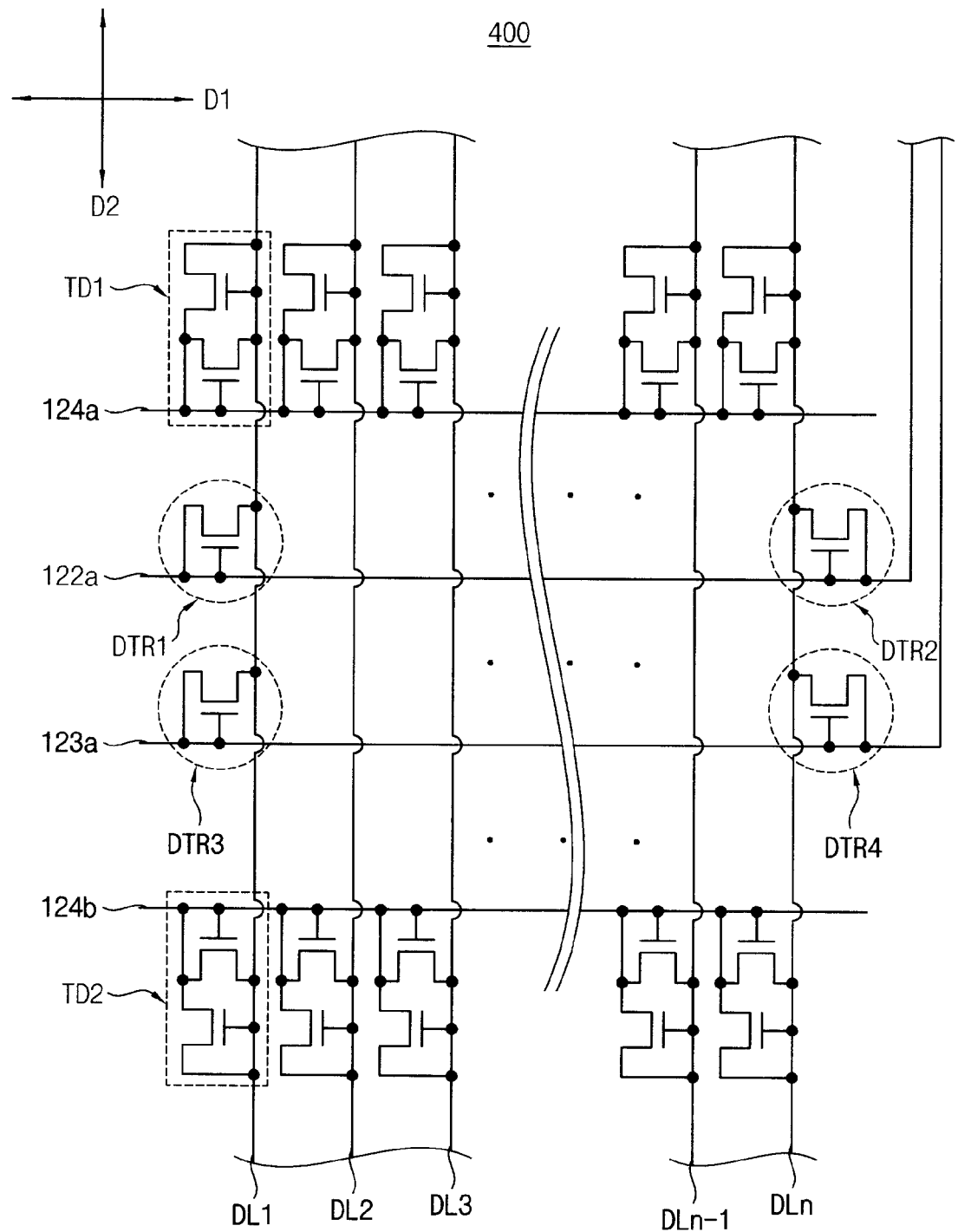
FIG. 2 is a plan view of an exemplary embodiment of a first static electricity prevention part of an array substrate of the display apparatus shown in FIG. 1.

The first static electricity prevention part 400 is disposed between the data driving chip 200 and the display area DA. The first static electricity prevention part 400 according to an exemplary embodiment includes a first static electricity dispersion wiring 124a, a second static electricity dispersion wiring 124b, a first static electricity diode DTR1 and a second static electricity diode DTR2 (FIG. 2). The first static electricity prevention part 400 may further include a third static electricity diode DTR3 and a fourth static electricity diode DTR4 (FIG. 2). The first static electricity prevention part 400 is electrically connected to first terminals of the first, second, third, . . . , (n−1)-th and n-th data lines DL1, DL2, DL3, DLn−1 and DLn.

The second static electricity prevention part 500 is disposed in the peripheral area PA adjacent to the lower region of the display area DA. The second static electricity prevention part 500 may include a third static electricity dispersion wiring 124c, a fourth static electricity dispersion wiring 124d and static electricity diodes (not shown). The second static electricity prevention part 500 is electrically connected to second terminals of the first, second, third, . . . , (n−1)-th and n-th data lines DL1, DL2, DL3, . . . , DLn−1 and DLn.

The first static electricity prevention part 400 and the second static electricity prevention part 500 disperses the static electricity generated during manufacturing of the array substrate 100 and/or the static electricity introduced from an external source into the array substrate 100, to the signal wirings. Therefore, in an exemplary embodiment, damage to patterns formed in the display area DA due to the static electricity is effectively prevented.

Hereinafter, a more detailed description of the first static electricity prevention part 400 will be provided with reference to FIGS. 2 through 5. The second static electricity prevention part 500 is substantially the same as the first static electricity prevention part 400 except for a position thereof on the array substrate 100. Therefore, any repetitive detailed description of the second static electricity prevention part 500 will hereinafter be omitted.

FIG. 2 is a plan view of the first static electricity prevention part 400 of an array substrate of the display apparatus shown in FIG. 1.

Referring to FIG. 2, the first static electricity prevention part 400 may include a first two-way diode TD1 electrically connected to the first static electricity dispersion wiring 124a and a second two-way diode TD2 electrically connected to the second static electricity dispersion wiring 124b.

At the first static electricity prevention part 400, each of the first sub-line 122a and the third sub-line 123a extend along the first direction D1. The first static electricity dispersion wirings 124a and the second static electricity dispersion wirings 124b are partially extended along the first direction D1 substantially in parallel with the first sub-line 122a and the third sub-line 123a. The first sub-line 122a of the first repair line 122 and the third sub-line 123a of the second repair line 123 may be disposed between the first static electricity dispersion wiring 124a and the second static electricity dispersion wiring 124b, as shown in FIG. 2.

The first static electricity diode DTR1 is electrically connected to the first sub-line 122a and the first data line DL1. The first static electricity diode DTR1 is turned on by static electricity introduced through the first sub-line 122a and then transfers the static electricity to the first data line DL1. The static electricity received by the first data line DL1 moves along the second direction D2 and is transferred to the first two-way diode TD1 and/or the second two-way diode TD2. The first two-way diode TD1 blocks the movement of the static electricity to the data driving chip 200 and the second two-way diode TD2 blocks the movement of the static electricity to the display area DA.

The second static electricity diode DTR2 is electrically connected to the first sub-line 122a of the first repair line 122 and the n-th data line DLn (e.g., the last data line DL). The second static electricity diode DTR2 is turned on by static electricity introduced through the first sub-line 122a and then transfers the static electricity to the n-th data line DLn. The static electricity received by the n-th data line DLn moves along the second direction D2 and is transferred to the first two-way diode TD1 and/or the second two-wary diode TD2.

The third static electricity diode DTR3 is electrically connected to the third sub-line 123a of the second repair line 123 and the first data line DL1. The third static electricity diode DTR3 is substantially the same as the first static electricity diode DTR1 except that the third static electricity diode DTR3 is connected to the third sub-line 123a. In addition, the fourth static electricity diode DTR4 is electrically connected to the third sub-line 123a of the second repair line 123 and the n-th data line DLn. The fourth static electricity diode DTR4 is substantially the same as the second static electricity diode DTR2 except that the fourth static electricity diode DTR4 is connected to the third sub-line 123a. Accordingly, any repetitive detailed explanation thereof will hereinafter be omitted.

The first two-way diode TD1 is connected to the first static electricity dispersion wiring 124a. The first two-way diode TD1 is connected to the first, second, third, . . . , (n−1)-th and n-th data lines DL1, DL2, DL3, . . . , DLn−1 and DLn. The second two-way diode TD2 is connected to the second static electricity dispersion wiring 124b. The second two-way diode TD2 is connected to the first, second, third, . . . , (n−1)-th and n-th data lines DL1, DL2, DL3, . . . , DLn−1 and DLn. The first two-way diode TD1 and the second two-way diode TD2 disperse the first static electricity dispersion wiring 124a, the second static electricity dispersion wiring 124b and/or the static electricity to the first static electricity prevention part 400.

Figure 3:
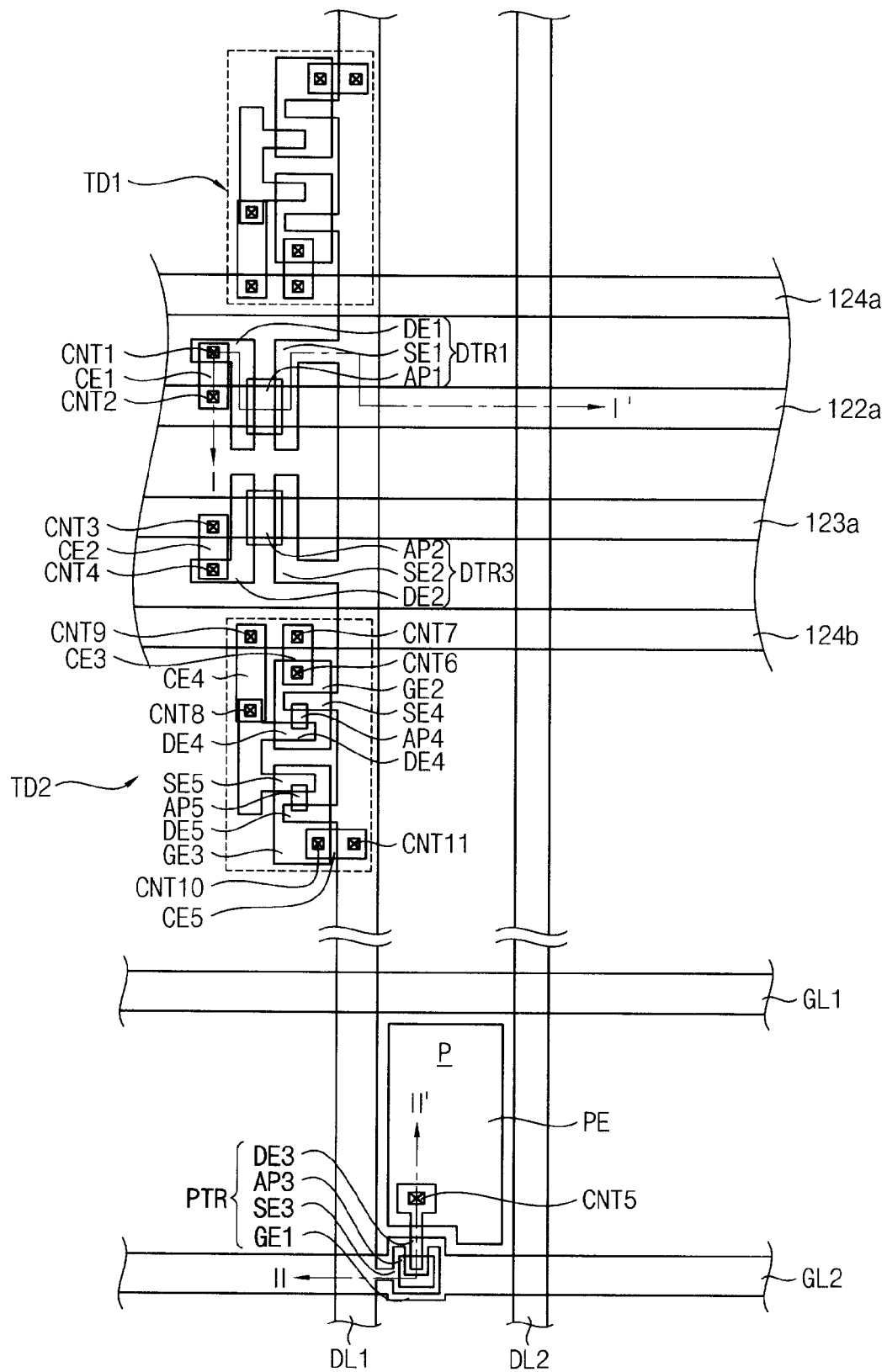
FIG. 3 is a plan view of a pixel and a portion of the first static electricity prevention part of the array substrate shown in FIG. 1.

FIG. 3 is a plan view of a pixel and a portion of the first static electricity prevention part of the array substrate of the display apparatus shown in FIG. 1.

Referring to FIG. 3, the first static electricity diode DTR1 includes a first input electrode SE1, a first output electrode DE and a first active pattern AP1. The first input electrode SE1 overlaps the first sub-line 122a and is connected to the first data line DL1. A portion of the first sub-line 122a overlapping with the first input electrode SE1 is a controlling electrode of the first static electricity diode DTR1. The first output electrode DE1 overlaps the first sub-line 122a and is spaced apart from the first input electrode SE1. The first output electrode DE1 may be electrically connected to the first sub-line 122a through a first connecting electrode CE1. The first connecting electrode CE1 makes contact with the first output electrode DE1 through a first contact hole CNT1 partially exposing the first output electrode DE1, and makes contact with the first sub-line 122a through a second contact hole CNT2 partially exposing the first sub-line 122a. The first active pattern AP1 is disposed between the first sub-line 122a and the first input electrode SE1, and may be disposed between the first sub-line 122a and the first output electrode DE1.

In an exemplary embodiment, the second static electricity diode DTR2 is substantially the same as the first static electricity diode DTR1 except that the input electrode is connected to the n-th data line DLn.

The third static electricity diode DTR3 includes a second input electrode SE2, a second output electrode DE2 and a second active pattern AP2. The second input electrode SE2 overlaps the third sub-line 123a and is connected to the first data line DL1. A portion of the third sub-line 123a overlapping with the second input electrode SE2 is a controlling electrode of the second static electricity diode DTR2. The second output electrode DE2 overlaps with the third sub-line 123a and is spaced apart from the second input electrode SE2. The second output electrode DE2 may be electrically connected to the third sub-line 123a through the second connecting electrode CE2. The second connecting electrode CE2 makes contact with the second output electrode DE2 through a third contact hole CNT3 partially exposing the second output electrode DE2 and makes contact with the third sub-line 123a through a fourth contact hole CNT4 partially exposing the third sub-line 123a. The second active pattern AP2 is disposed between the third sub-line 123a and the second input electrode SE2 and may be disposed between the third sub-line 123a and the second output electrode DE2.

In an exemplary embodiment, the fourth static electricity diode DTR4 is substantially the same as the third static electricity diode DTR3 except that the input electrode is connected to the n-th data line DLn.

A plurality of pixels P is disposed in the display area DA. In an exemplary embodiment, pixels P of the plurality of pixels P may be divided by the first gate line GL1 and the second gate line GL2 and the first data line DL1 and the second data line DL2. Each of the pixels P includes a pixel transistor PTR and a pixel electrode PE electrically connected to the pixel transistor PTR. The pixel transistor PTR includes a first controlling electrode GE1, a third input electrode SE3, a third output electrode DE3 and a third active pattern AP3. The first controlling electrode GE1 is connected to the second gate line GL2. The third active pattern AP3 is disposed on the first controlling electrode GE1. The third input electrode SE3 is connected to the first data line DL1 and the third output electrode DE3 is spaced apart from the third input electrode SE3. The third input/output electrodes SE3 and DE3 are disposed on the third active pattern AP3. The pixel electrode PE is electrically connected to the pixel transistor PTR through a fifth contact hole CNT5 exposing a terminal portion of the third output electrode DE3.

The first sub-lines 122a and the third sub-line 123a may be formed by patterning the gate metal layer while forming the first gate line GL1 and the second gate line GL2. The first input and output electrodes SE1 and DE1, respectively, and the second input and output electrodes SE2 and DE2, respectively, may be formed via patterning the data metal layer in forming the first data line DL1 and the second data line DL2. The first active pattern AP1 and the second active pattern AP2 may be formed via patterning a semiconductor layer in forming the third active pattern AP3. In an exemplary embodiment, the semiconductor layer may include amorphous silicon, for example. The first connecting electrode CE1 and the second connecting electrode CE2 may be formed via patterning a transparent electrode layer in forming the pixel electrode PE.

The second two-way diode TD2 includes a second controlling electrode GE2, a third controlling electrode GE3, fourth input and output electrodes SE4 and DE4, respectively, fifth input and output electrodes SE5 and DE5, respectively, a fourth active pattern AP4 and a fifth active pattern AP5. The second two-way diode TD2 includes a first diode and a second diode. The first diode transmits a signal along the second direction D2, and the second diode substantially transmits a signal along the first direction D1. The first diode is defined by the second controlling electrode GE2, the fourth input and output electrodes SE4 and DE4, respectively, and the fourth active pattern AP4. The second diode is defined by the third controlling electrode GE3, the fifth input and output electrodes SE5 and DE5, respectively, and the fifth active pattern AP5.

In an exemplary embodiment, the second controlling electrode GE2 is electrically connected to the second static electricity dispersion wiring 124b through the third connecting electrode CE3. The third connecting electrode CE3 makes contact with the second controlling electrode through a sixth contact hole CNT6 partially exposing the second controlling electrode GE2, and may be connected to the second static electricity dispersion wiring 124b through a seventh contact hole CNT7 partially exposing the second static electricity dispersion wiring 124b. The fourth input electrode SE4 is disposed on the second controlling electrode GE2 and is connected to the first data line DL1. The fourth output electrode DE4 is disposed on the second controlling electrode GE2 and is spaced apart from the fourth input electrode SE4. The fourth output electrode DE4 is electrically connected to the second static electricity dispersion wiring 124b through a fourth connecting electrode CE4. The fourth connecting electrode CE4 makes contact with the fourth output electrode DE4 through an eighth contact hole CNT8 partially exposing the fourth output electrode DE4, and is electrically connected to the second static electricity dispersion wiring 124b through a ninth contact hole CNT9 partially exposing the second static electricity dispersion wiring 124b.

The third controlling electrode GE3 is electrically connected to the first data line DL1 through a fifth connecting electrode CE5. The fifth connecting electrode CE5 is connected to the third controlling electrode GE3 through a tenth contact hole CNT10 partially exposing the third controlling electrode GE3 and is electrically connected to the first data line DL1 through an eleventh contact hole CNT11 partially exposing the first data line DL1. The fifth input electrode SE5 is connected to the fourth output electrode DE4. The fifth output electrode DE5 is connected to the first data line DL1.

The first two-way diode TD1 is substantially the same as the second two-way diode TD2 except that the first two-way diode TD1 is connected to the first static electricity dispersion wiring 124a. Therefore, any repetitive detailed description thereof will hereinafter be omitted.

Figure 4:
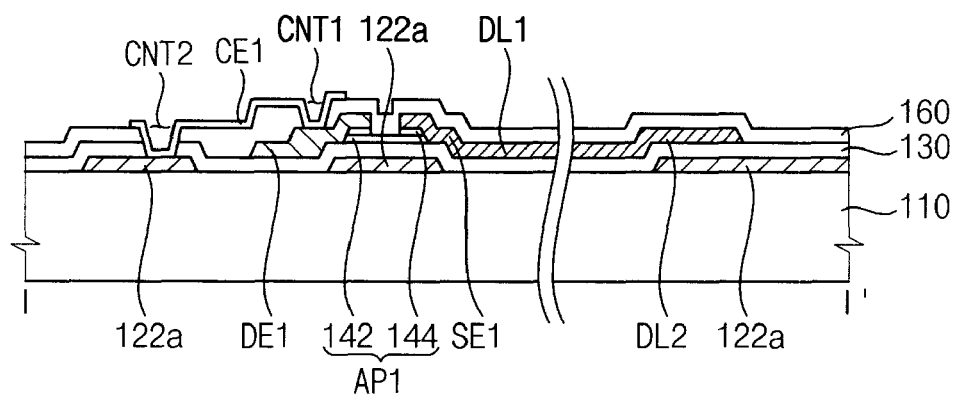
FIG. 4 is a partial cross-sectional view taken along line I-I' in FIG. 3.
Figure 5:
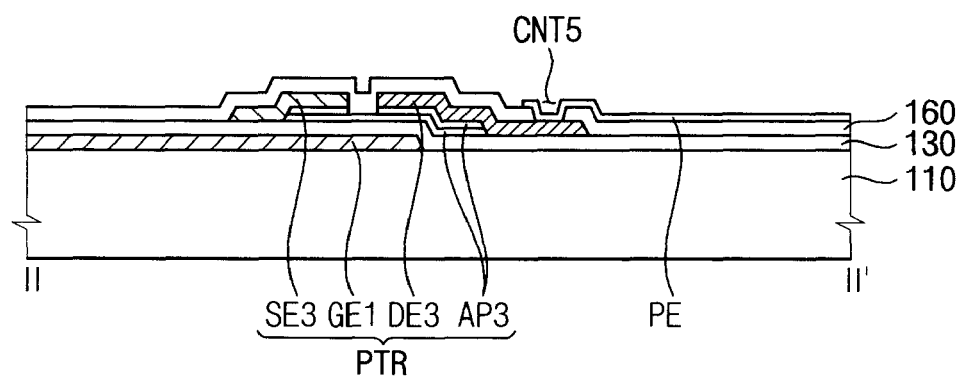
FIG. 5 is a partial cross-sectional view taken along line II-II' in FIG. 3.

FIG. 4 is a partial cross-sectional view taken along line I-I' in FIG. 3. FIG. 5 is a partial cross-sectional view taken along line II-II' in FIG. 3.

Referring to FIGS. 4 and 5, a gate pattern including the first sub-line 122a and the second gate line GL2 is formed on a substrate 110. A gate insulation layer 130 is formed on the substrate 110 including the gate pattern formed thereon.

The first active pattern AP1 and the third active pattern AP3 are formed on the substrate 110 including the gate insulation layer 130 formed thereon.

A source pattern including the first input electrode SE1, the first output electrode DE1, the second data line DL2, the third input electrode SE3 and the third output electrode DE3 is formed on the substrate 110 including the first active pattern AP1 formed thereon. The second data line DL2 is insulated from the first sub-line 122a by means of the gate insulation layer 130.

A passivation layer 160 is formed on the substrate including the source pattern formed thereon. The first contact hole CNT1 may be formed by partially removing the passivation layer 160 on the first output electrode DE1. The second contact hole CNT2 may be formed by partially removing the passivation layer 160 and the gate insulation layer 130 on the first sub-line 122a. The fifth contact hole CNT5 may be formed by partially removing the passivation layer 160 on the third output electrode DE3.

The transparent electrode pattern including the first connecting electrode CE1 and the pixel electrode PE is formed on the passivation layer 160. The first connecting electrode CE1 electrically connects the first sub-line 122a with the first output electrode DE1 through the first contact hole CNT1 and the second contact hole CNT2. The pixel electrode PE makes contact with the third output electrode DE3 through the fifth contact hole CNT5.

Hereinafter, an exemplary embodiment of a method of manufacturing the array substrate illustrated in FIGS. 2 and 3 will be described in further detail with reference to FIGS. 4 and 5.

Referring to FIGS. 4 and 5, a gate metal layer (not fully shown) is formed on the substrate 110, and the gate metal layer is patterned to form the gate pattern. The gate pattern includes the first gate line GL1 and the second gate line GL2, the first sub-line 122a and the third sub-line 123a, the first static electricity dispersion wiring 124a and the second electricity dispersion wiring 124b and the first, second and third gate electrodes GE1, GE2 and GE3, respectively.

The gate insulation layer 130 is formed on the substrate 110 including the gate pattern formed thereon.

A semiconductor pattern is formed on the substrate 110 including the gate insulation layer 130. The semiconductor pattern includes the first, second, third, fourth and fifth active patterns AP1, AP2, AP3, AP4 and AP5, respectively. Each of the first, second, third, fourth and fifth active patterns AP1, AP2, AP3, AP4 and AP5, respectively, may include a semiconductor layer 142 formed on the gate insulation layer 130 and an ohmic contact layer 144 formed on the semiconductor layer 142. The semiconductor layer 142 may include amorphous silicon, and the ohmic contact layer 144 may include amorphous silicon doped with n-type dopants at a high concentration.

A data metal layer (not fully shown) is formed on the substrate 110 including the semiconductor pattern, and the data metal layer is patterned to form the source pattern. The source pattern includes the first, second, third, . . . , (n–1)-th and n-th data lines DL1, DL2, DL3, . . . , DLn–1 and DLn, the first input and output electrodes SE1 and DE1, respectively, the second input and output electrodes SE2 and DE2, respectively, the third input and output electrodes SE3 and DE3, respectively, the fourth input and output electrodes SE4 and DE4, respectively, and the fifth input and output electrodes SE5 and DE5, respectively.

The passivation layer 160 is formed on the substrate 110 including the source pattern, and the passivation layer 160 and the gate insulation layer 130 are patterned to form the first through eleventh contact holes CNT1, CNT2, CNT3, CNT4, CNT5, CNT6, CNT7, CNT8, CNT9, CNT10 and CNT11, respectively.

A transparent electrode layer (not fully shown) is formed on the passivation layer 160, and the transparent electrode layer is patterned to form the first through fifth electrodes CE1, CE2, CE3, CE4 and CE5, respectively, as well as the pixel electrode PE.

For the array substrate 100 manufactured by an exemplary embodiment, electrical connections of the gate pattern, the source pattern, the first through fifth connecting electrodes CE1, CE2, CE3, CE4 and CE5, respectively, and the pixel electrode PE are inspected. During the inspection, a defect such as a short circuit and/or an open circuit of the first, second, third, . . . , (n–1)-th and n-th data lines DL1, DL2, DL3, . . . , DLn–1 and DLn is detected.

From the inspection results, the first, second, third, . . . , (n–1)-th and n-th data lines DL1, DL2, DL3, . . . , DLn–1 and DLn are determined to be normal if the data driving signal is normally applied to the first, second, third, . . . , (n–1)-th and n-th data lines DL1, DL2, DL3, DLn–1 and DLn. However, if one or more of the first, second, third, . . . , (n–1)-th and n-th data lines DL1, DL2, DL3, . . . , DLn–1 and DLn is defective, e.g., is shorted or is opened, the data driving signal is not applied to the shorted/open data line and the pixels P connected to the shorted/open data line do not operate appropriately. In this case, a repair process according to an exemplary embodiment for repairing the shorted/open data line using the first repair line 122 and the second repair line 123 is performed.

Hereinafter, a more detailed description of a display apparatus including a repaired array substrate, and an exemplary embodiment of a repair process thereof, will be provided with reference to FIG. 6 though 8.

Figure 6:
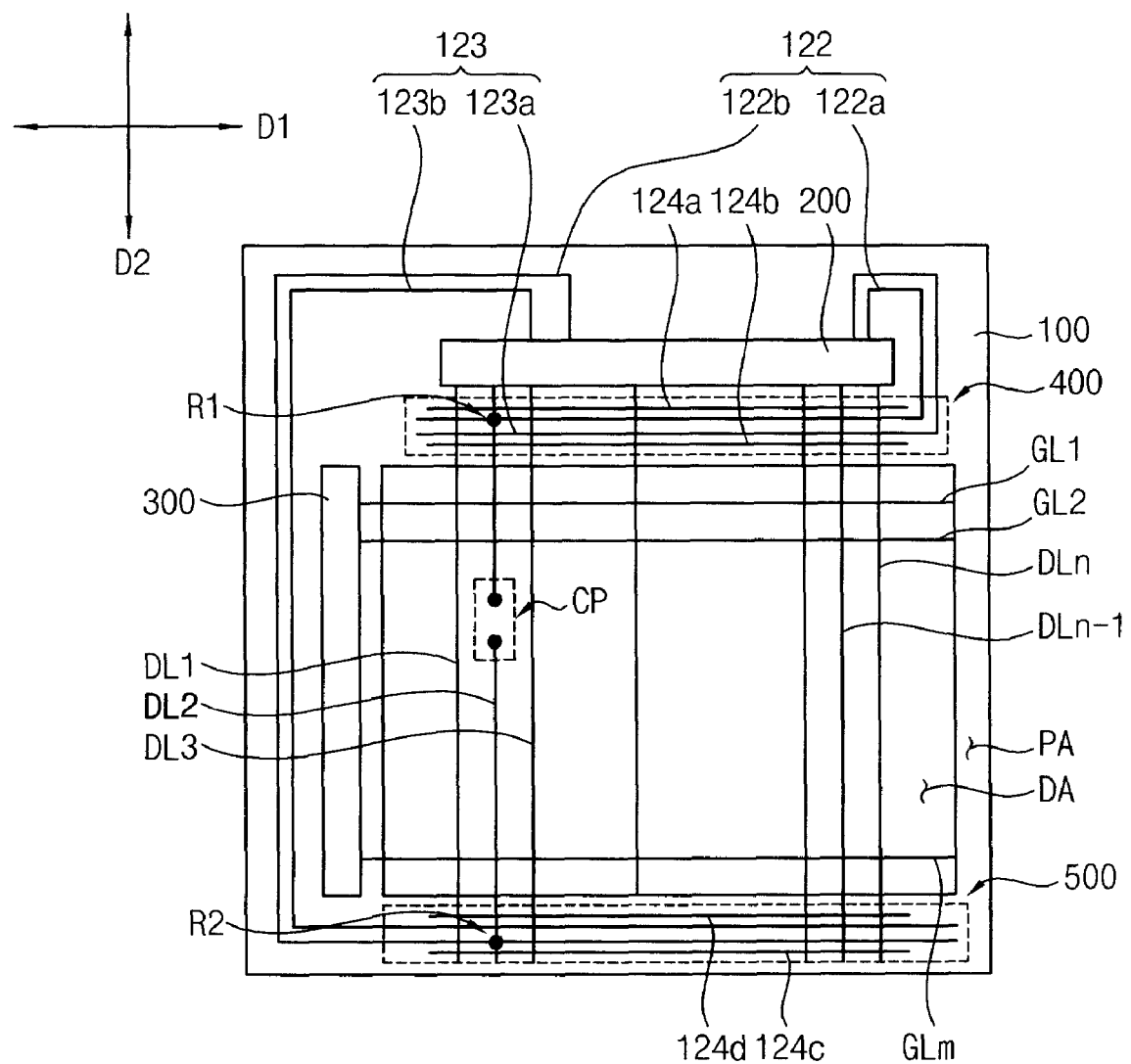
FIG. 6 is a plan view of an exemplary embodiment of a display apparatus in which a data line is repaired.

FIG. 6 is a plan view of an exemplary embodiment of a display apparatus in which a data line is repaired. The same or like components of FIGS. 1 through 5 are labeled with the same reference characters in FIG. 6, and any repetitive detailed description thereof will hereinafter be omitted.

Referring to FIG. 6, the display apparatus 600 according to an exemplary embodiment includes the array substrate 100, the data driving chip 200 and the gate driving part 300. The array substrate 100 includes the first, second, third, . . . , (n–1)-th and n-th data lines DL1, DL2, DL3, . . . , DLn–1 and DLn, the static electricity diode part SDP and the first static electricity prevention part 400. The array substrate 100 may further include a second static electricity prevention part 500. As shown in FIG. 6, the second data line DL2 is an opened data line including an open circuited part CP in the display area DA of the array substrate 100. The static electricity diode part SDP includes at least one repair line. In the exemplary embodiment shown in FIG. 6, for example, the static electricity diode part SDP includes a first repair line 122 and a second repair line 123.

The array substrate 100 of the display apparatus according to an exemplary embodiment is substantially the same as the array substrate of the display apparatus according to exemplary embodiments described in further detail above with reference to FIG. 1, except for the second data line DL2 which is the opened data line, and the first repair part R1 and the second repair part R2. Therefore, any repetitive detailed description of the same or like components will hereinafter be omitted.

Figure 8:
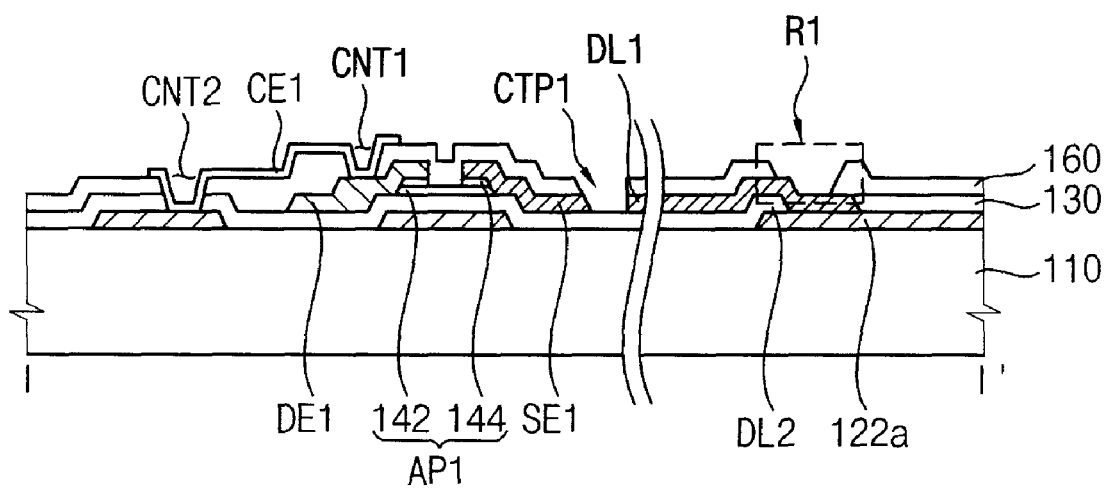
FIG. 8 is a partial cross-sectional view of a first cutting part of the first static electricity prevention part shown in FIG. 7.

The first repair part R1 is disposed in a region between the data driving chip 200 and the display area DA, e.g., the crossing region of the first sub-line 122a of the first repair line 122 disposed in the upper portion of the display area DA and the second data line DL2. The second data line DL2 makes direct contact with the first sub-line 122a at the first repair part R1, as best shown in FIG. 8. The second repair part R2 extends from the data driving chip 200 and the crossing region of the second sub-line 122b of the first repair line 122 disposed in the lower portion of the display area DA and the second data line DL2. The second data line DL2 makes direct contact with the second sub-line 122b at the second repair part R2. Therefore, the data driving signal is transmitted from the data driving chip 200 through the first sub-line 122a and the second sub-line 122b, even though the second data line DL2 includes the open part CP.

Figure 7:
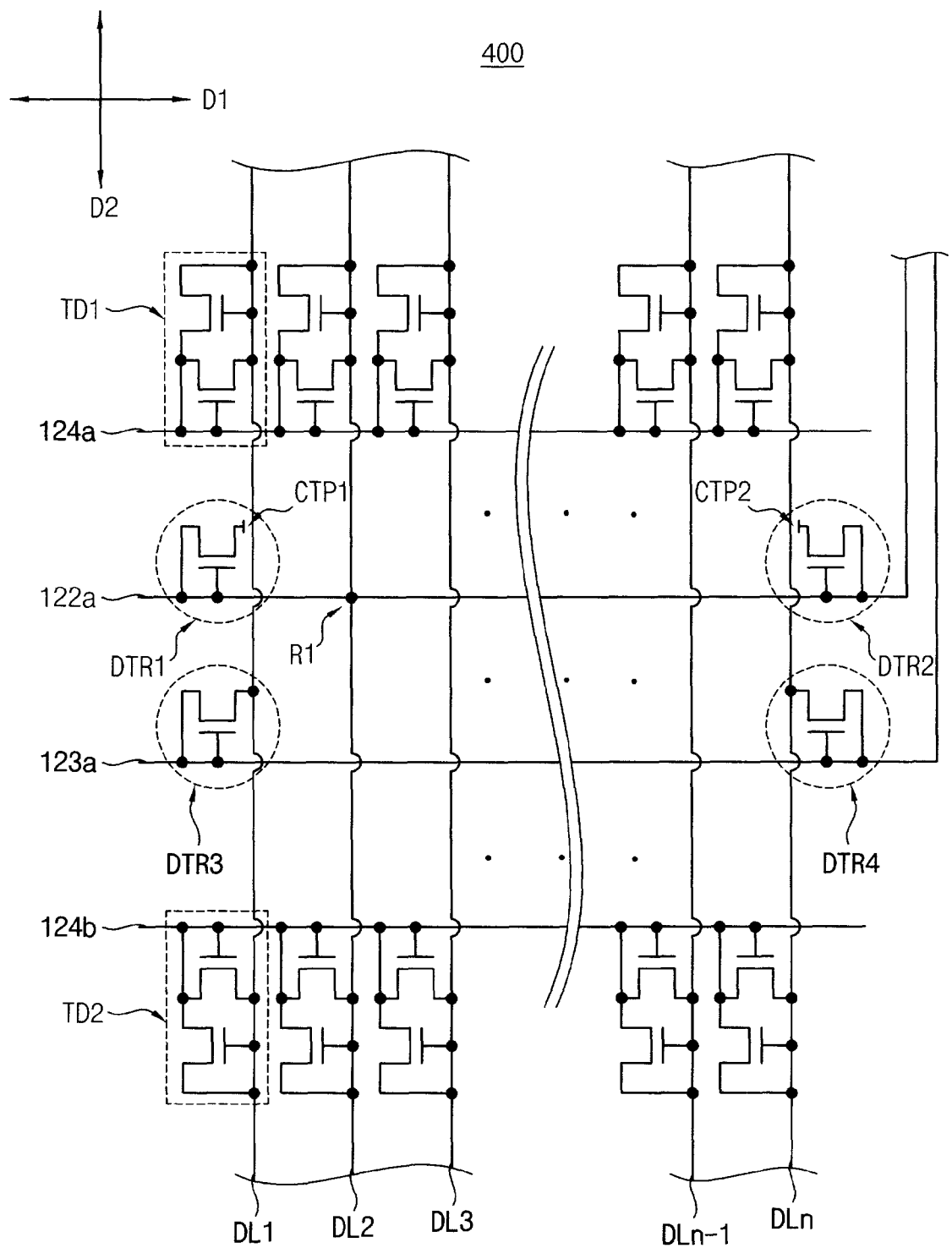
FIG. 7 is a plan view of a first static electricity prevention part of the display apparatus shown in FIG. 6.

FIG. 7 is a plan view of a first static electricity prevention part 400 of the display apparatus shown in FIG. 6.

Referring now to FIG. 7, the first static electricity prevention part 400 includes the first static electricity dispersion wiring 124a, the second static electricity dispersion wiring 124b, the first static electricity diode DTR1 and the second static electricity diode DTR2. The first static electricity prevention part 400 may further include the third static electricity diode DTR3 and the fourth static electricity diode DTR4 (FIG. 2). The first static electricity prevention part 400 is electrically connected to a first terminal of the first, second, third, (n−1)-th and n-th data lines DL1, DL2, DL3, . . . , DLn−1 and DLn.

The exemplary embodiment of the first static electricity prevention part 400 shown in FIG. 7 is substantially the same as the first static electricity prevention part described in greater detail above with reference to FIG. 2, except for first cutting part CTP1 and the second cutting part CTP2. Therefore, any repetitive detailed description of the same or like components will hereinafter be omitted.

The first cutting part CTP1 is a separated region between the input electrode of the first static electricity diode DTR1 and the first data line DL1. Initially, the input electrode of the first static electricity DTR1 is connected to the first data line DL1. When the second data line DL2 is electrically connected to the first sub-line 122a of the first repair line 122, the connecting part of the first static electricity diode DTR1 with the first data line DL1 is cut, and thus the first static electricity diode DTR1 is electrically separated from the first data line DL1.

The second cutting part CTP2 is a separated region between the input electrode of the second static electricity diode DTR2 and the n-th data line DLn, e.g., the last data line DL. When the second data line DL2 is electrically connected to the first sub-line 122a of the first repair line 122, the connecting part of the second static electricity diode DTR2 with the n-th data line DLn is cut, and the second static electricity diode DTR2 is thereby electrically separated from the n-th data line DLn.

Alternatively, the first though fourth static electricity diodes DTR1, DTR2, DTR3 and DTR4, respectively, may be electrically separated from the first and n-th data lines DL1 and DLn, respectively, by cutting the associated connecting parts of the first and third static electricity diodes DTR1 and DTR3, respectively, with the first data line DL1 and by cutting the associated connecting parts of the second and fourth static electricity diodes DTR2 and DTR4, respectively, with the n-th data line DLn.

FIG. 8 is a partial cross-sectional view of the first cutting part of the first static electricity prevention part shown in FIG. 7.

Referring to FIG. 8, the second data line DL2 and the first sub-line 122a make direct contact with each other at the first repair part R1, and the second data line DL2 is thereby electrically connected to the first sub-line 122a. In addition, at the second repair part R2, the second data line DL2 and the second sub-line 122b make direct contact with each other, and the second data line DL2 is electrically connected with the second sub-line 122b.

The first static electricity diode DTR1 and the first data line DL1 may be electrically separated from each other at the first cutting part CTP1 by cutting the connecting part of the first input electrode SE1, which is the input electrode of the first static electricity diode DTR1, with the first data line DL1. In addition, the second static electricity diode DTR2 and the n-th data line DLn may be electrically separated from each other at the second cutting part CTP2 through cutting the connecting part of the input electrode of the second static electricity diode DTR2 with the n-th data line DLn, as described above.

An exemplary embodiment of a method of manufacturing the array substrate illustrated in FIG. 8 will now be described in further detail with reference to FIGS. 4, 5 and 8.

The array substrate illustrated in FIG. 8 is manufactured by performing, among other things, a repair process on the array substrate illustrated in FIGS. 4 and 5. Therefore, the array substrate before performing the repair process is substantially the same as the array substrate illustrated in FIGS. 4 and 5 except that the array substrate includes the second data line DL2, which is the opened data line. Accordingly, any repetitive detailed description thereof has hereinafter been omitted.

Referring to FIGS. 4, 5 and 8, the first sub-line 122a of the first repair line 122 is electrically connected to the first static electricity diode DTR1. The second data line DL2 is insulated from the first sub-line by means of the gate insulation layer 130.

Referring to FIG. 8, energy is applied to a crossing region of the second data line DL2 and the first sub-line 122a and to the crossing region of the second data line DL2 and the second sub-line 122b using an energy source such as a laser, for example.

The second data line DL2 and the first sub-line 122a thereby make direct contact with each other at the first repair part R1, and the second data line DL2 is thereby electrically connected to the first sub-line 122a. In addition, the second data line DL2 and the second sub-line 122b make direct contact with each other at the second repair part R2, and the second data line DL2 is thereby electrically connected to the second sub-line 122b.

As described above, the first static electricity diode DTR1 and the first data line DL1 may be electrically separated from each other at the first cutting part CTP1 by cutting the connecting part of the first input electrode SE1 which is the input electrode of the first static electricity diode DTR1 with the first data line DL1 using the laser. Similarly, the second static electricity diode DTR2 and the n-th data line DLn may be electrically separated from each other at the second cutting part CTP2 by cutting the connecting part of the input electrode of the second static electricity diode DTR2 with the n-th data line DLn by means of the laser. Thus, in an exemplary embodiment, the opened second data line DL2 is effectively repaired.

As described herein, static electricity generated at a repair line during manufacturing of an array substrate, or introduced into the repair line from an external source, is effectively dispersed by a static electricity dispersion wiring via a static electricity diode. Accordingly, in an exemplary embodiment, an array substrate, including a defect caused by the static electricity is easily repaired, and the repaired array substrate is used in a manufacturing of a display substrate for an LCD panel, thereby substantially reducing manufacturing costs thereof.

The present invention should not be construed as being limited to the exemplary embodiments set forth herein. Rather, these exemplary embodiments are provided so that this disclosure will be thorough and complete and will fully convey the concept of the present invention to those skilled in the art. Moreover, the description herein is illustrative of exemplary embodiments of the present invention and is not to be construed as limiting thereof.

While the present invention has been particularly shown and described with reference to exemplary embodiments thereof, it will be understood by those of ordinary skill in the art that various changes in form and details may be made therein without departing from the spirit or scope of the present invention as defined by the following claims.

What is claimed is:

1. An array substrate comprising:
   a substrate including a display area and a peripheral area surrounding the display area;
   data lines disposed in the display area, a portion of the data lines extending from the display area into the peripheral area at a first side of a periphery of the display area;
   a repair line disposed in the peripheral area and crossing the portion of the data lines extending into the peripheral area; and
   a static electricity diode part electrically connected to the repair line and a first data line of the data lines, the static electricity diode part comprises a first static electricity diode and a second electricity diode,
   wherein the first static electricity diode is electrically connected to the repair line and the first data line, the first data line is adjacent to a second side of the periphery, and the data lines do not extend into the peripheral area at the second side of the periphery of the display area, and
   wherein the second static electricity diode is electrically connected to the repair line and a last data line of the data lines, the last data line is adjacent to a third side of the periphery of the display area and the third side of the periphery faces the second side of the periphery.

2. The array substrate of claim 1, wherein the first static electricity diode comprises:
   an input electrode connected to the first data line;
   an output electrode spaced apart from the input electrode and connected to the repair line; and
   an active pattern disposed between the input electrode and the output electrode.

3. The array substrate of claim 2, wherein
   a first end of the input electrode and a first end of the output electrode of the first static electricity diode are insulated from and overlap the repair line, and
   a second end of the output electrode is electrically connected to the repair line.

4. The array substrate of claim 1, wherein the second static electricity diode comprises:
   an input electrode connected to the last data line;
   an output electrode spaced apart from the input electrode and connected to the repair line; and
   an active pattern disposed between the input electrode and the output electrode of the second static electricity diode.

5. The array substrate of claim 4, wherein
   a first end of the input electrode and a first end of the output electrode of the second static electricity diode are insulated from the repair line and overlap the repair line, and
   a second end of the output electrode is electrically connected to the repair line.

6. The array substrate of claim 1, further comprising:
   a static electricity dispersion wiring disposed in the peripheral area and aligned substantially perpendicular to the data lines; and
   a two-way diode connected to at least one of the data lines and the static electricity dispersion wiring.

7. The array substrate of claim 6, wherein the static electricity dispersion wiring comprises:
   a first electricity dispersion wire disposed at a first side of the repair line; and
   a second electricity dispersion wire disposed at an opposite second side of the repair line.

8. An array substrate comprising:
   a substrate including a display area and a peripheral area surrounding the display area;
   data lines disposed in the display area, a portion of the data lines extending from the display area into the peripheral area at a first side of a periphery of the display area;
   a repair line disposed in the peripheral area and crossing the portion of the data lines extending to the peripheral area; and
   a static electricity diode part comprising a first static electricity diode and a second electricity diode, each static electricity diode comprising:
   an input electrode spaced apart from a first data line;
   an output electrode electrically connected to the repair line; and
   an active pattern disposed between the input electrode and the output electrode, wherein
   the first static electricity diode is electrically connected to the repair line and the first data line of the data lines, the first data line is adjacent to a second side of the periphery, and the data lines do not extend into the peripheral area at the second side of the periphery of the display area, and
   wherein the second static electricity diode is electrically connected to the repair line and a last data line of the data lines, the last data line is adjacent to a third side of the periphery of the display area, and the third side of the periphery faces the second side of the periphery.

9. The array substrate of claim 8, wherein
   one of the data lines is an opened data line, and
   the opened data line is repaired by electrically connecting the opened data line to the repair line.

* * * * *